United States Patent Office 3,305,700
Patented Feb. 21, 1967

3,305,700
ELECTROMAGNETIC PROTECTIVE RELAYS
HAVING A WOUND ROTOR
Peter Lewis Moreton, Felton, Somerset, Eric Paddison, Stafford, and Frank Edward Higton, Ashbourne, England, assignors to The English Electric Company Limited, London, England, a British company
Filed Sept. 9, 1963, Ser. No. 307,678
Claims priority, application Great Britain, Sept. 11, 1962, 34,736/62
13 Claims. (Cl. 317—58)

The invention relates to electrical protective relays, that is to say, relays operative, under predetermined conditions, to cause a signal to be produced for, for example, bringing about the automatic de-energisation and/or disconnection of electrical plant from its source of supply.

According to the invention, an electrical protective relay has a rotor movable between a rest position and a second position in which the relay is operative and carrying a winding, the rotor co-operating with poles of a stationary magnetic flux producing means so that a torque acting on the rotor is produced when the rotor winding carries a direct current, and including electrical circuit means for causing a direct current to be passed through the rotor winding to produce a torque acting on the rotor to return it to its rest position when displaced therefrom, the electrical circuit means being activated by a reduction of a relay input current which displaced the rotor from its rest position to a value below a predetermined level.

Preferably, the electrical means includes means for connecting a source of direct current of suitable polarity to the rotor winding.

In a preferred embodiment of the invention, the means for connecting a source of direct current to the rotor winding includes in series a first pair of contacts and a second pair of contacts, the first pair of contacts being closed by movement of the rotor from its rest position, and the second pair of contacts being closed in response to the said reduction of the relay input current.

Preferably, the second pair of contacts is controlled by an auxiliary coil energised by the relay input current when above the said predetermined level, the contacts being closed by de-energisation of the coil.

According to another feature of the invention, the rotor has an additional winding so arranged relative to the first-mentioned rotor winding that when it carries a direct current with the rotor substantially in the said second position, it co-operates with the said poles to produce an additional driving torque on the rotor so as to ensure movement of the rotor to the second position.

Figure 1:
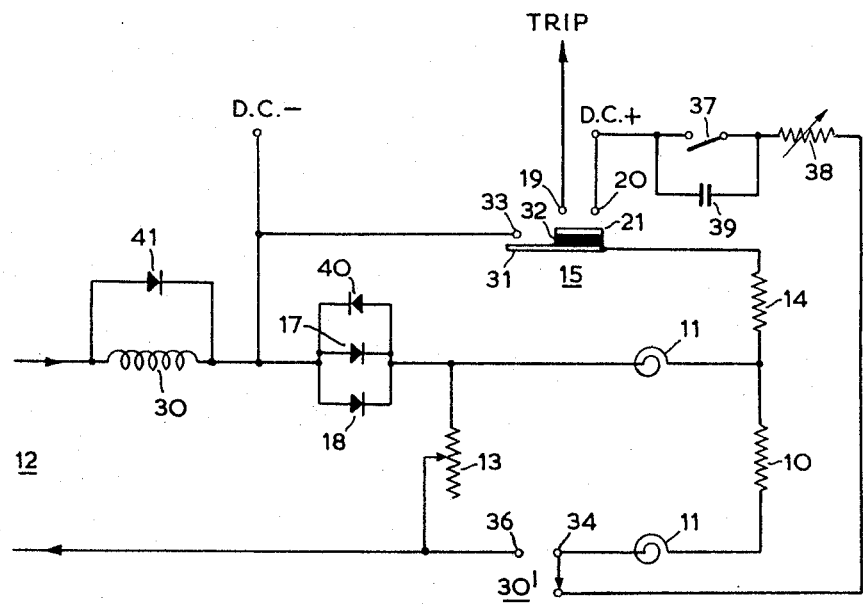
Figure 2:
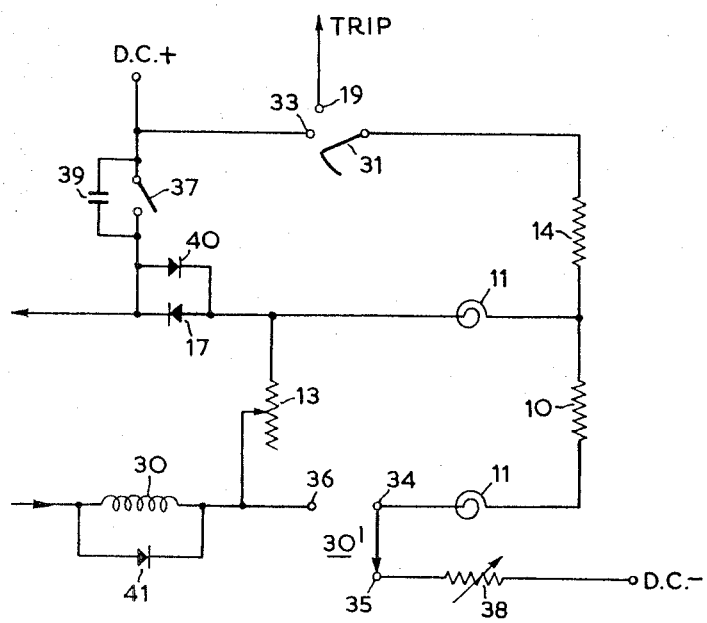

An electrical protective relay embodying the invention will now be described by way of example and with reference to the accompanying drawing in which:

FIG. 1 shows diagrammatically the rotor windings of the relay and one form of input circuit thereof; and FIG. 2 shows diagrammatically the rotor windings and another form of input circuit.

Referring to FIG. 1 of the drawing, a first or main winding 10 of the relay is connected, through control spring ligaments 11, a coil 30 of an auxiliary relay and diodes 17, 18 and 40, to input connections 12. The latter are connected by means of current transformer and rectifier means (not shown) to the circuit to be protected by the relay so that the relay is supplied with a D.C. input current representing the magnitude of the alternating current in the protected circuit.

A variable resistor 13, shunted across the winding 10, provides means for enabling adjustment of the pick-up value of the relay at which the current flow through the main rotor winding 10, in co-operation with the poles of a stationary magnet (not shown), is just sufficient to rotate the rotor.

A second or seal-in winding 14 is connected in series with the winding 10 and is supplied from the input connections 12. This winding is shunted by the two parallel connected diodes 17, 18.

The contact arrangement 15 consists of three fixed contacts 19, 20, 33, and a movable contact blade 21 attached to, but insulated from, a second blade 31 by a layer of insulating material 32. The composite blade assembly 21, 31, 32 is mounted for rotation with the rotor in such a way that, when the rotor is displaced from its rest position to a second position in which the relay is operative, the blade 21 engages the contacts 19, 20, and the blade 31 engages the contact 33. The blade 31 is connected to the winding 14. The contacts 19 and 20 are connected respectively to a trip circuit and to the positive terminal of a D.C. supply, whilst the terminal 33 is connected to the negative terminal of the D.C. supply and also to the junction between the coil 30 and one side of the diodes 17, 18. The contact arrangement 15 is so arranged that the blade 31 engages the contact 33 before the blade 21 engages the contacts 19, 20.

The auxiliary relay coil 30 operates a changeover contact 30' of the "break before make" kind which is connected to the winding 10 at a terminal 34 and which normally engages a fixed contact 35, pivoting into engagement with a second fixed contact 36 when the coil 30 is excited by a current of predetermined magnitude. This current of predetermined magnitude corresponds to the pick-up current of the relay which is adjusted on the variable resistor 13.

A contact pair 37, associated with the back stop of the rotor, is so arranged that the contacts are open when the rotor is in its rest position and thus against the back stop, and closed as soon as the rotor departs therefrom. It is connected between the contacts 20 and 35 through a variable resistor 38. A capacitor 39 is connected across the contact pair 37 for the purpose of quenching any sparks occurring when the contacts separate.

The diode 40 is connected in parallel with, but in the reverse direction to, the diodes 17, 18.

In operation, when the monitored current supplied through the input connections 12 is below the pick-up value for the relay, the auxiliary coil 30 has insufficient energisation to close contacts 34 and 36, so that the main winding 10 remains unenergised. When the auxiliary coil 30 has been energised sufficiently, by the input current exceeding the pick-up value, the contact 30' changes over so as to engage the contact 36. The main winding 10 of the rotor is now energised by direct current from the input connections 12, the value of this current representing the magnitude of the alternating current in the protected circuit. When the rotor moves from the rest position in response to the relay input current, the contact 37 closes.

If the fault in the protected circuit persists, the rotor is turned to its operative position due to the torque exerted by interaction of the current in the winding 10 and the flux produced by the stationary magnet of the relay. The blade 31 then engages the contact 33 and thereby completes a circuit for the operating current through the seal-in winding 14. In this position, the current in the winding 14 interacts with the magnet to produce an additional or seal-in torque. This additional torque assists the further rotation of the rotor so as to cause the blade 21 to engage the contacts 19, 20 (the blade 31 maintaining its engagement with the contact 33), so that the trip circuit is completed, indicating that the relay is operative.

If the circuit of the additional winding 14 is completed by movement of the rotor in response to a low value of input current, then the high resistance offered by the diodes 17 and 18 to this low value of current ensures that the proportion of the current passing through the winding 14 is high compared with the proportion passing through the winding 10. However, the resistance of the diodes 17 and 18 varies non-linearly with the current passing through them, and if the input current has a high value when the circuit to the additional winding 14 is completed, then the diode resistance will be lower and the proportion of the input current passing through the winding 14 will be reduced. Hence the seal-in torque is prevented from becoming excessive and is only substantial at low operating currents, that is, when it is most required.

Completion of the trip circuit causes the circuit protected by the relay to be disconnected from its supply, whereupon the coil 30 of the auxiliary relay becomes de-energised and its change-over contact 30' returns to the position in which it engages the contact 35. This completes the circuit from the positive terminal of the trip supply to the negative terminal through the contact 37, resistor 38, main rotor winding 10, ligaments 11 and diode 40. The direct current passing through the winding 10 is of opposite polarity to the current previously provided from the input connections 12, so that the rotor has a reverse torque applied to it causing it to return rapidly to its rest position.

When the rotor reaches the back stop, the contact 37 opens and thereby de-energises the winding 10.

If the fault in the protected circuit is removed or subsides before the rotor reaches its operative position, the resultant de-energisation of the coil 30 and consequent return of the change-over contact 30' to the position shown in the drawing again causes a direct current to pass through the winding 10 so as to set up a reverse torque as described above.

The variable resistor 38 controls the magnitude of the direct current which produces the reverse torque and is preset according to the voltage of the trip supply.

If desired, a diode 41 may be connected across the coil 30 for limiting the burden at high input currents.

Moreover, if desired, the main winding 10 may be as illustrated and described in the U.S. Patent No. 3,252,053, filed September 15, 1961, by Eric Paddison, as may be the seal-in winding 14. The insulating bases on which the windings are arranged may then be bonded together to form a composite rotor.

FIG. 2 shows an alternative circuit arrangement in which items performing similar functions to items in FIG. 1 are similarly referenced. The circuit operates in a similar manner to the circuit of FIG. 1 but has a slightly simplified arrangement of contacts. The contact arm 31 engages the contact 33 when the rotor approaches the operative position, and then engages both contacts 19 and 33.

What we claim as our invention and desire to secure by Letters Patent is:

1. An electrical protective relay having a rotor movable between a rest position and a second position in which the relay is operative and carrying a winding, the rotor co-operating with poles of a stationary magnetic flux producing means so that a torque acting on the rotor is produced when the rotor winding carries a direct current, and including electrical circuit means for causing a direct current to be passed through the rotor winding to produce a torque acting on the rotor to return it to its rest position when displaced therefrom, the electrical circuit means being activated by a reduction of a relay input current which displaced the rotor from its rest position to a value below a predetermined level.

2. A relay according to claim 1, in which the electrical means includes means for connecting a source of direct current of suitable polarity to the rotor winding.

3. A relay according to claim 2, in which the means for connecting the source of direct current to the rotor winding includes in series a first pair of contacts and a second pair of contacts, the first pair of contacts being closed by movement of the rotor from its rest position, and the second pair of contacts being closed in response to the said reduction of the relay input current.

4. A relay according to claim 3, in which the second pair of contacts is controlled by an auxiliary coil energised by the relay input current when above the said predetermined level, the contacts being closed by de-energisation of the coil.

5. A relay according to claim 2, including a pair of trip contacts arranged to be electrically connected when the rotor is in its said second position for providing an indication that the relay is operative.

6. A relay according to claim 5, in which one contact of the trip contacts is supplied with direct current from the said source of direct current.

7. A relay according to claim 5, in which the rotor has an additional winding so arranged relative to the first-mentioned rotor winding that when it carries a direct current with the rotor substantially in the said second position, it co-operates with the said poles to produce an additional driving torque on the rotor so as to ensure movement of the rotor to the second position.

8. A relay according to claim 7, including electric circuit means connected with the rotor windings and arranged so that in use at least a proportion of the input current to the relay passes through the additional winding of the rotor at least when the rotor is substantially in the said second position.

9. A relay according to claim 8, in which the rotor carries contact means arranged for electrically engaging a first fixed contact when the rotor is substantially in the said second position so as to complete a circuit allowing the said proportion of the input current through the additional winding on the rotor.

10. A relay according to claim 9, in which the said contact means on the rotor is arranged to electrically connect the said pair of trip contacts when the rotor is in its said second position.

11. A relay according to claim 10, in which the said circuit means includes modifying means for reducing the proportion of the input current which passes through the additional winding as the magnitude of the input current increases.

12. A relay according to claim 11, in which the modifying means comprises non-linear resistance means, having a non-linear resistance-current characteristic, connected in series with the first winding of the rotor and arranged to be connected in parallel with the additional winding of the rotor when the contact means on the rotor engages the said first fixed contact.

13. A relay according to claim 12, in which the non-linear resistance means comprises a diode.

References Cited by the Examiner

UNITED STATES PATENTS 2,042,109   5/1936   Lamb _____ 317—152 X

MILTON O. HIRSHFIELD, *Primary Examiner.*

J. D. TRAMMEL, *Assistant Examiner.*